Sept. 14, 1954  P. E. SANDORFF  2,688,772
TREATMENT OF CRAZE SUSCEPTIBLE PLASTIC ARTICLES
Filed Aug. 25, 1951  2 Sheets-Sheet 2
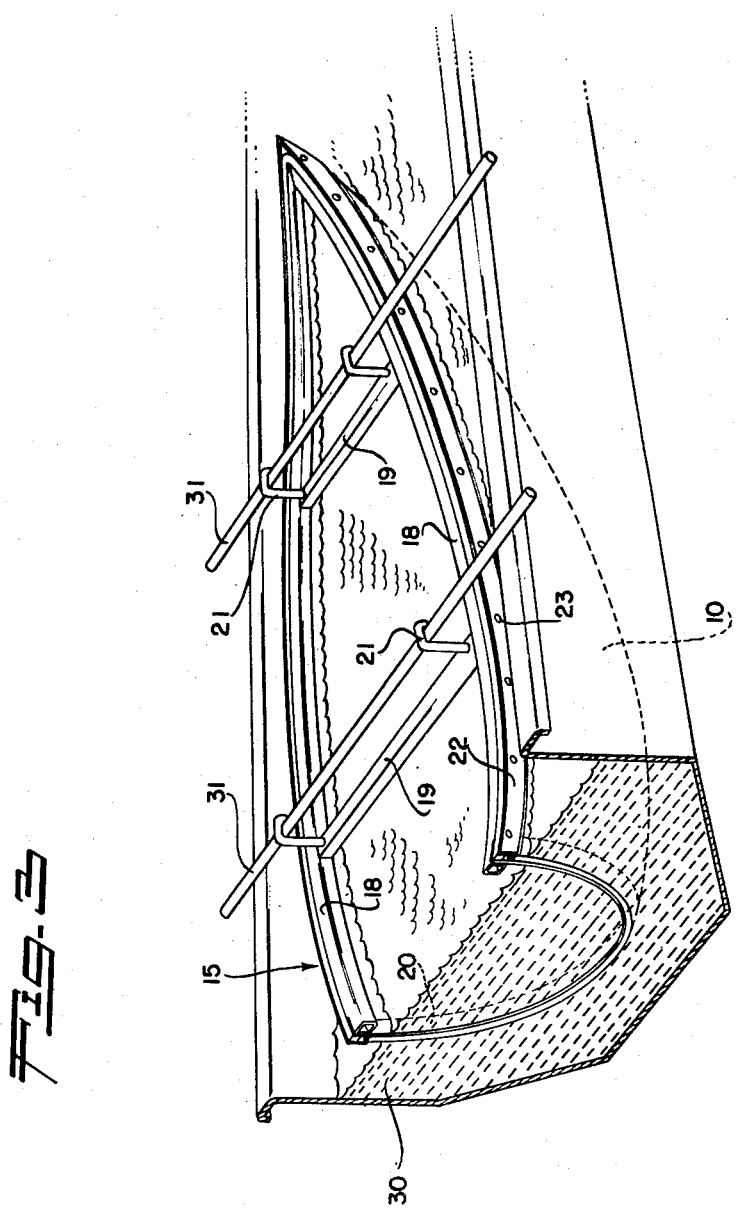
INVENTOR.
PAUL E. SANDORFF
BY
Agent Patented Sept. 14, 1954

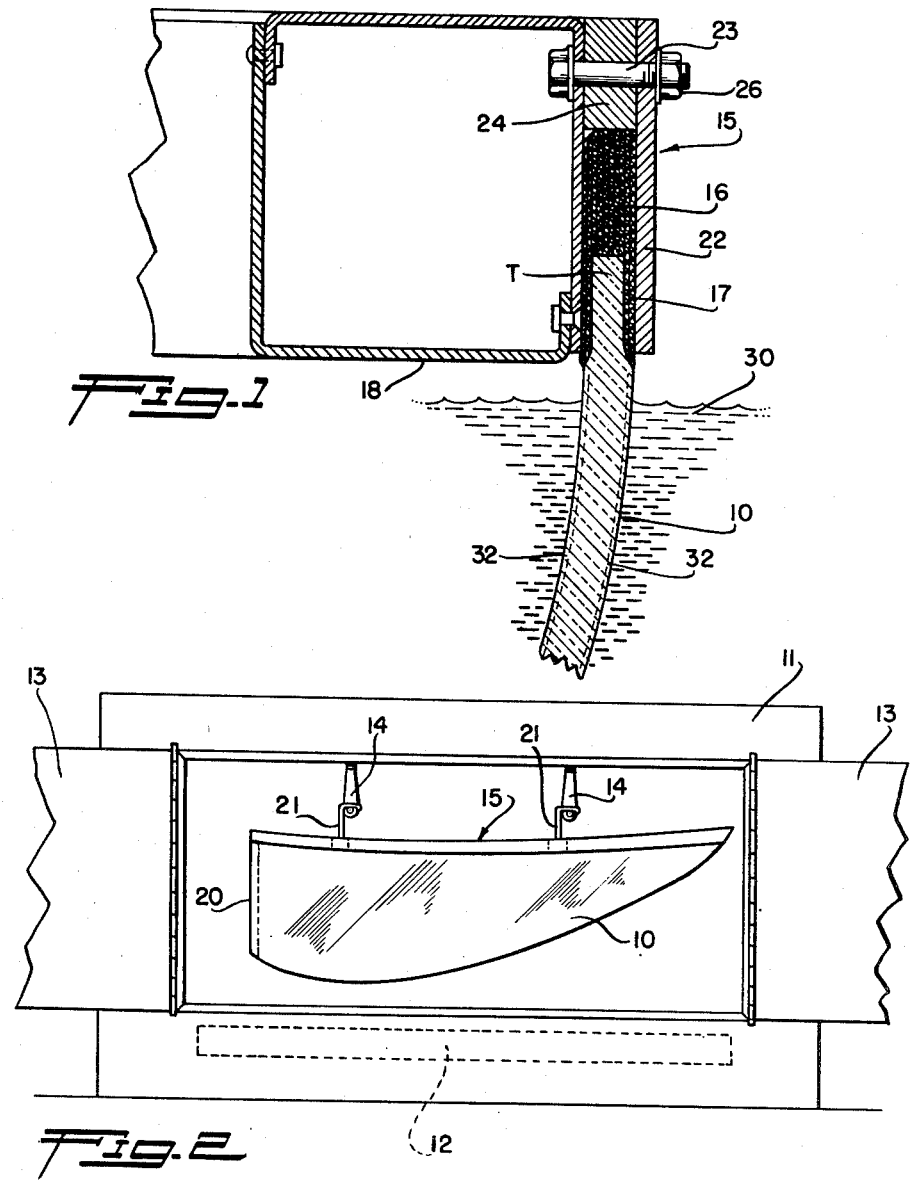

2,688,772

UNITED STATES PATENT OFFICE 2,688,772

TREATMENT OF CRAZE SUSCEPTIBLE PLASTIC ARTICLES

Paul E. Sandorff, Van Nuys, Calif., assignor to Lockheed Aircraft Corporation, Burbank, Calif.

Application August 25, 1951, Serial No. 243,728

12 Claims. (Cl. 18—48)

This invention relates to treatment of plastic materials and relates more particularly to methods for treating objects constructed of acrylic plastics and other materials subject to surface fissuring or crazing to render them resistant to such crazing.

Structures or articles constructed of transparent acrylic plastics such as airplane cockpit enclosures or canopies, windshields, windows, etc. are very subject to structural deterioration by spontaneous fissuring of the surfaces, usually referred to as crazing. This crazing renders the structures unsuitable for use and the same must be rejected and discarded. As these articles are expensive to manufacture their rejection, because of the crazing, results in a substantial monetary loss and considerable effort has been made to avoid or overcome the tendency of the plastics to surface craze. Attempts to salvage the defective parts by mechanically removing the surface strata at the crazed regions have proved futile because the crazing reappears at the same regions after a few hours. Various conventional annealing treatments have been resorted to in conjunction with the mechanical reworking of the affected areas but produced no significant improvement.

While the present invention is not confined to the treatment of given articles or structures, I will herein refer to the treatment of cockpit enclosures or canopies. Such canopies usually have special edge attachments or areas comprising laminations of fibre-glass cloth cast or cemented in the margins of the canopy to facilitate the securing of the same to the airplane. As a result of the various attempts to correct the crazing by mechanically removing the surfaces of the affected areas, by annealing procedures, etc. it appears that residual tensile stresses exist in the surfaces of the plastic and that these stresses cause the fissuring or crazing. It also appears that in the case of canopies such as herein referred to and provided with the fibre-glass fabric edge elements, standard or conventional annealing treatments adversely affect the structures probably because of the differences in the coefficients of thermal expansion and contraction of the plastic and fibre-glass fabric.

It is a general object of the present invention to provide a simple inexpensive and commercially practical method for treating articles or structures such as above mentioned which permanently removes the tendency for them to develop surface fissures or crazing.

It is another object of the invention to provide a method of this kind that introduces permanent compressive stresses in the surfaces of the articles or structures to prevent the development therein of crazing or surface fissuring. The method may be employed either as a precautionary measure to avoid any possibility of crazing or as a remedial procedure preventing the crazing of articles that have shown a tendency to develop surface crazing.

A further object of the invention is to provide a method or process of this character wherein the article is heat treated at a relatively high temperature for a selected period of time and is then immediately quenched or cooled, thus establishing residual compressive stresses in the surfaces of the article which inhibit crazing of the surfaces.

A still further object is to apply the above mentioned process to an article having laminate reinforced edges wherein the cooling or quenching is performed in such a manner that the marginal reinforced regions are left unquenched or uncooled so as to remain relatively hot for some time following the cooling of the other regions thus establishing compressive stresses in adjacent regions of the article to inhibit surface crazing. I have found that the canopies or articles treated in this manner show no tendency to craze even under the extended application of strong solvents that usually or normally produce crazing in such parts.

Other objectives and features of the invention will become apparent from the following detailed description of typical manners of carrying out or performing the same, wherein reference will be made to the accompanying drawings in which:

Figure 1 is an enlarged fragmentary vertical sectional view of an edge portion of a canopy and the jig secured thereon and showing the main part or body of the canopy in the quenching bath;

Figure 2 is a reduced side elevation of the canopy arranged in the oven for the heat treatment; and Figure 3 is a perspective view showing the canopy suspended in the quenching bath with an end of the quneching tank appearing in vertical cross section.

In the drawings I have shown the manner of handling and treating one type of cockpit enclosure, it being understood that this is merely typical and that the invention is not to be construed as limited to the treatment of this or any other given type of plastic structure.

The method or treatment of the invention considered broadly, may be said to comprise generally the heating of the article and the immediate cooling of the body of the article more rapidly than its marginal regions.

The first step or act of the treatment, namely the heating of the article, may be performed with any appropriate apparatus. Thus in Figure 2 I have shown a cockpit enclosure or canopy 10 suspended in an oven 11 of the general type often employed in annealing operations, etc. The oven 11 has an appropriate heat source 12 such as fuel burners, electric heating elements or the like, and an entrance that is closed by suitable doors 13 when in operation. The canopy 10 may be arranged in any convenient or selected position in the oven, for example it may be suspended in an inverted position as illustrated. Suitable hangers 14 may serve to suspend the canopy in the oven. The preparation of the canopy 10 for arrangement in the oven 11 will depend at least to some extent upon whether the treatment is to be a precautionary operation to prevent possible subsequent surface crazing or is to be in a remedial operation to remove crazing already present. If the treatment is merely a precautionary one no special preparation is required and the article or canopy 10 may be simply cleansed of all undesirable foreign matter and properly arranged in the oven. When the treatment is to be a remedial one the protective covering, if any, oftentimes provided on the plastic canopy, is peeled off for some distance from its edges, and the areas thus exposed are polished with a suitable polishing compound and buffing wheel, or the like, to facilitate visual inspection for possible present crazing. If such crazing is found from .001 to .002 inches of the surface area is sanded away or otherwise mechanically removed, taking care not to locally overheat the plastic. When all visible fissuring or crazing has been removed, the reworked areas are cleansed and polished and the canopy is cleansed of all foreign material including the remaining protective film, if any.

In one preferred manner of carrying out the invention a jig 15 is secured on the margins of the canopy 10 when the same is ready for arrangement in the heat treat oven. This jig 15 has several functions. It serves to retain heat in the edge regions of the canopy 10 after removal from the oven, it serves to prevent deformation of the canopy during the heat treatment, and serves as a convenient means for handling and mounting the canopy during the process.

The jig 15 is constructed so that it may be readily applied to and removed from the canopy 10. The character and construction of the jig will, of course, depend to a large extent upon the shape and nature of the canopy. It is desirable to form the jig so that it covers or encloses the entire or substantially the entire edge attachment region of the canopy. As illustrated in Figure 1, the particular canopy of the drawings has fibre-glass fabric laminations 16 extending along its edge with inner and outer flanges or extension 17 lapped over and bonded with a tongue T of reduced thickness to be substantially flush with the inner and outer surfaces of the canopy proper. The laminated fabric 16 and its extensions 17 are plastic or resin impregnated to provide the canopy with a strong edge for attachment to the airplane, the fabric being cast or bonded rigidly and permanently with the plastic of the canopy.

The jig 15, as illustrated, includes a frame having metal side members 18 curved and shaped to conform with the internal surfaces of the edge region of the canopy. The frame further includes cross or transverse rods 19 extending between and connected with the side members 18 and one or more curved bows 20 extending between the side members and capable of preventing distortion of the canopy during the heat treatment. The above-mentioned hangers 14 may cooperate with hooks 21 on the cross rods 19 to suspend the canopy during handling and heat treatment. The jig 15 further includes outer members 22 in the nature of elongate metal plates or strips shaped and curved to conform with the outer surface of the edge regions of the canopy 10. These outer members 22 are removably secured to the frame members 18 by screws or bolts 23. The bolts 23 pass through openings in spacers 24 secured to the members 18 and adapted to overlie the edges of the laminations 16, assuming the canopy to be inverted as shown in Figure 1. Removable nuts 26 are threaded on the bolts 23 to secure the outer members 22 in place where the laminations 16 and their extensions 17 are held or confined between the frame members 18 and the members 22. The members 18 and 22 and the spacers 24 have sufficient volume or mass to act as effective heat retainers or ballasts during the cooling or quenching of the canopy 10, as will be later described. It is to be understood that where the jig 15 is employed its edge members 18 and 22 preferably completely enclose the fibre-glass laminations and overlap practically all of the tongues or flanges 17 so that the edge attachment region of the canopy 10 is confined within the jig.

The above described jig 15 is applied to the canopy 10, prepared as previously set forth, prior to arranging the canopy in the oven and the jig is heated together with the canopy. In accordance with the invention the canopy 10 with its jig 15 is heated at a temperature of from 180° F. to 220° F. for 1 hour 30 minutes to 2 hours and 30 minutes. I have found that the best results are obtained by heating the canopy and jig for approximately 2 hours at about 200° F.

The next step of the treatment provided by this invention is the cooling of the canopy 10. If desired, this may be accomplished by simply removing the canopy 10 and its jig 15 from the oven 11 and allowing the same to air cool. If this is done the metal jig 15 engaged on the edge attachment regions of the canopy 10 acts as a heat ballast to maintain the temperature of these regions at a high value for some time while the plastic body of the canopy air cools. The ultimate or retarded cooling of the margin establishes the residual compressive stresses in adjacent regions of the body of the canopy 10 to prevent subsequent surface crazing. The preferred manner of cooling the heat treated canopy 10 is by chilling or quenching the canopy in a water bath while its edge attachment region remains hot and semiplastic in the heat ballast jig 15. This is done by removing the canopy 10 and its jig 15 from the heat treatment oven 11 at the end of the selected heat treating period and then immediately, that is within say, thirty seconds, immersing the canopy 10 in a quenching bath 30 of water at a depth where the edge members 18 and 22 of the jig and the laminations 16 and their flanges 17 are above the water level. The above mentioned hooks 21 may be engaged on rods 31 to suspend the canopy in the bath. This is shown in Figure 1 where it will be seen that the plastic canopy 10 is immersed in the bath 30 with the jig members 18 and 22 spaced a short distance, say ¼ inch above the water level. This results in rapid cooling or quenching of the plastic canopy 10 while the laminated edge 16—17 remains hot and semiplastic in the heat ballast jig 15. The hot and semiplastic edge region conforms to the final cold dimensions of the adjacent areas of the body of the canopy 10. The jig 15 and edge regions of the canopy are then allowed to air cool slowly so that the edge regions 16, 17 and T become solid and tend to shrink, thus undergoing tension and placing the adjacent regions of the canopy 10 under compressive stresses. In addition, in the other portions of the body of the canopy, a similar delayed cooling and shrinking effect takes place in the core of the transparent material with respect to the surface regions 32, indicated by the broken lines in Figure 1, thus producing residual compressive stresses in these surface regions. These residual compressive stresses, in the major body of the canopy and in the marginal regions, prevent the subsequent development of surface fissures or crazing in the canopy.

Instead of employing the jig 15 as above described, the canopy 10 may be heat treated for about one hour at a temperature of approximately 200° F., then removed from the oven 11 and immersed in the quenching bath 30 to a depth where is edge attachment regions remain above the water level to air cool. This procedure results in the provision of residual compressive stresses in the body of the plastic canopy 10 to prevent subsequent surface crazing but is not believed to be as effective as the previously described procedure. Again residual compressive stresses may be set up in the plastic canopy to prevent subsequent surface crazing by heating the canopy in the oven 11 at say 180° F. for approximately one hour without the jig 15 and then upon removing the canopy from the oven applying cloth pads soaked in cold water to the regions of the canopy adjacent the edge attachment areas to locally quench the canopy while the edge attachment regions remain relatively hot and therefore semi-plastic.

The above described treatment or method of the invention has been found to condition plastic aircraft canopies to be resistant to surface crazing even after prolonged weathering and subjection to the action of solvents such as isopropanol and acetone which ordinarily produce such crazing in a short time. The method is simple and readily performed by unskilled workman and does not require expensive equipment or materials.

Having described only typical forms of the invention I do not wish to be limited to the specific details herein set forth, but wish to reserve to myself any variations or modifications that may appear to those skilled in the art and fall within the scope of the following claims.

I claim:

1. The method for treating a plastic-material article having edge laminations which comprises heating the article to a semi-plastic but shape retaining condition, and then cooling the regions of the article adjacent said laminations more rapidly than the laminations to establish residual compressive stresses in said regions.

2. The method of conditioning a plastic material article having fabric-reinforced edges against surface fissuring which comprises heating the article throughout its thickness and extent, and then cooling the regions adjacent said edges while said edges remain at an elevated temperature, said edges being subsequently allowed to cool and thereupon shrink relative to said regions.

3. The method for preventing surface crazing of a plastic material article having an edge reinforced by dissimilar material, which method comprises heating the article, quenching the article while maintaining said edge at an elevated temperature, and then allowing said edge to cool.

4. The method of treating an acrylic plastic article having an edge reinforced by a fibreglass fabric edge reinforcement which comprises heating the article at from 180° F. to 220° F. for from 60 to 150 minutes, and then cooling the article except at said edge so that said edge remains hot whereby the subsequent cooling of said edge establishes compressive stresses in the article.

5. The method of treating an acrylic plastic article having an edge region reinforced by a fibre-glass fabric edge reinforcement which comprises heating the article at from 180° F. to 220° F. for from 60 to 150 minutes, cooling all parts of said article except said edge region, and maintaining said edge region hot during such cooling whereby the subsequent cooling of said edge establishes compressive stresses in adjacent parts of the article.

6. The method for treating an acrylic plastic article having glass fabric laminations on its edge region which comprises arranging a heat retaining object on said edge region, heating the article and the object thereon, and then cooling the article without cooling said edge region or object whereby subsequent cooling of said laminations establishes residual compressive stresses in adjacent regions of the article.

7. The method for treating an acrylic plastic article having glass fabric laminations on its edge region which comprises arranging a heat retaining object on said edge, heating the article and the object thereon, for from 60 to 150 minutes at from 180° F. to 220° F., and then cooling the article without cooling said edge region or object whereby subsequent cooling of said laminations establishes residual compressive stresses in adjacent regions of the article.

8. The method for treating an acrylic plastic article having a marginal glass fabric reinforcement which comprises enclosing the margin of the article in a jig, heat treating the article with the jig thereon for from 60 to 150 minutes at from 180° F. to 220° F., then quenching the article except for its margin, the jig serving as a heat ballast to keep the margin hot during said quenching, and then removing the jig from the article when its margin has cooled.

9. The method of treating a contoured acrylic plastic object having a marginal fiber-glass fabric reinforcement, the method comprising arranging a contour maintaining and heat retaining jig on the margin of the object, then heat treating the object with the jig thereon for from 60 to 150 minutes at from 180° F. to 220° F., then immersing the object in a quenching bath to a level adjacent said jig and margin thus allowing said margin to cool more slowly than the balance of the object to establish compressive stresses in the object in regions adjacent the margin, and then removing the jig when cool.

10. The method of treating an acrylic plastic article having a marginal fibre-glass fabric reinforcement which comprises heat treating the article, and quenching the article except for its reinforced margin whereby the margin cools more slowly than the other regions of the article to set up compressive stresses in the article adjacent its margin.

11. The method for treating an acrylic plastic article having a margin reinforced with fibreglass laminations which comprises heating the article for about 2 hours at about 200° F., and then quenching the heated article except for said margin whereby the margin cools more slowly than the other regions of the article to establish compressive stresses in the article adjacent its margin.

12. The method of treating a plastic material article having a laminate edge reinforcement which comprises heating the article, rapidly cooling the major portion of the article while the edge region remains heated to effect a delayed cooling and shrinking of the core of said major portion with respect to the surface strata thereof to establish residual compressive stresses in said surface strata, and effecting a delayed cooling of said edge to also set up residual compressive stresses in the regions of the article adjacent said edge.

References Cited in the file of this patent

UNITED STATES PATENTS

| Number | Name | Date |
|---|---|---|
| 2,328,065 | Dreyfus | Aug. 31, 1943 |
| 2,373,093 | Baker | Apr. 10, 1945 |
| 2,402,221 | Wiley | June 18, 1946 |
| 2,444,420 | Borkland | July 6, 1948 |
| 2,514,088 | Pinsky | July 4, 1950 |